(12) United States Patent
Koo

(10) Patent No.: US 6,806,915 B2
(45) Date of Patent: Oct. 19, 2004

(54) METHOD AND APPARATUS FOR ECHO CANCELLATION IN DIGITAL COMMUNICATIONS USING AN ECHO CANCELLATION REFERENCE SIGNAL

(75) Inventor: David Koo, Carmel, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 422 days.

(21) Appl. No.: 09/848,061

(22) Filed: May 3, 2001

(65) Prior Publication Data

US 2003/0021339 A1 Jan. 30, 2003

(51) Int. Cl.[7] .......................... H04N 5/21; H04N 5/213; H04N 5/217
(52) U.S. Cl. ....................... 348/614; 348/611; 375/229; 375/231
(58) Field of Search ................................. 348/614, 611; 375/229, 230, 231, 232, 233, 234, 235, 236, 237, 238, 239, 350

(56) References Cited

U.S. PATENT DOCUMENTS

| | | | |
|---|---|---|---|
| 5,121,211 A | | 6/1992 | Koo .......................... 358/187 |
| 5,278,872 A | * | 1/1994 | Greenberg .................. 375/350 |
| 5,283,650 A | * | 2/1994 | Koo et al. .................. 348/614 |
| 5,321,512 A | * | 6/1994 | Huang ........................ 348/607 |
| 5,600,380 A | * | 2/1997 | Patel et al. ................. 348/614 |
| 5,623,318 A | * | 4/1997 | Lee ............................ 348/614 |
| 5,886,748 A | | 3/1999 | Lee ............................ 348/614 |
| 5,973,752 A | * | 10/1999 | Matsunaga ................. 348/614 |
| 6,480,239 B1 | * | 11/2002 | Patel et al. ................. 348/614 |

* cited by examiner

*Primary Examiner*—Michael H. Lee
*Assistant Examiner*—Trang U. Tran

(57) ABSTRACT

A novel echo cancellation reference ("ECR") training signal is inserted into the current ATSC 8 VSB data stream to achieve improved echo rejection while maintaining compatibility with the ATSC 8 VSB digital ATV standard. The novel ECR training signal is also suitable for other multipath or dispersive digital communication channels. A pre-equalization subsystem is included in the digital ATV system as a front end to the VSB receiver, and is trained with preferably the novel ECR training signal. One type of pre-equalization subsystem provides a fully ATSC compliant signal at its output, and therefore is particularly useful with standard VSB receivers. Another type of pre-equalization system provides a signal at its output which is ATSC compliant in some respects but which retains the ECR signal, and therefore is particularly useful for signal relays, analysis purposes, and other applications in which the residual channel information is important.

15 Claims, 5 Drawing Sheets

METHOD AND APPARATUS FOR ECHO CANCELLATION IN DIGITAL COMMUNICATIONS USING AN ECHO CANCELLATION REFERENCE SIGNAL

BACKGROUND OF THE INVENTION

Communication engineering continually must deal with the problem of restoring a signal that has been altered by the communication path over which the signal was transmitted. Signal restoration often can be achieved if the communication path is filly characterized, at least as to those parameters that contribute to the signal alteration. Thus, a frequently essential component of the signal restoration problem is that of identifying the characteristics of the communication path or channel.

One approach to the channel identification problem is to transmit a cancellation reference signal having a known characteristic, over the channel, and to receive the transmitted signal after it has passed through the channel. The originally transmitted signal is compared with the received signal, and a model of the channel characteristics is developed based on the comparison. One type of cancellation reference signal useful for correcting echo interference is known as an echo cancellation reference ("ECR") signal. Echo interference, which is also known as multipath or dispersive interference, affects analog and digital communications signals. An example of a system and ECR for improved echo cancellation in analog television receivers is described in U.S. Pat. No. 5,121,211, issued Jun. 9, 1992 to David Koo. Another system and architecture for echo cancellation suitable for television receives is described in U.S. Pat. No. 5,278,872, issued Jan. 11, 1994 to Craig B. Greenberg; and in U.S. Pat. No. 5,396,299, issued Mar. 7, 1995 to Craig B. Greenberg. An ECR also has been specified by the Advanced Television Systems Committee ("ATSC") of the United States, and is described in the following document: Advanced Television Systems Committee, Standard A/49: Ghost Canceling Reference Signal for NTSC, Approved Aug. 14, 1992 and Modified May 13, 1993.

A digital Advanced Television System ("ATV") has now been specified for the United States. The characteristics of the digital ATV are documented in various standards of the Advanced Television Systems Committee ("ATSC") and are available from the ATSC, 1750 K Street N.W., Suite 1200 Washington, D.C. 20006. Basically, the Digital Television Standard describes a system designed to transmit high quality video and audio and ancillary data over a single 6 MHz channel. The system can deliver reliably about 19 Mbps of throughput in a 6 MHz terrestrial broadcasting channel and about 38 Mbps of throughput in a 6 MHz cable television channel. Although the RF/Transmission subsystems described in the Digital Television Standard are designed specifically for terrestrial and cable applications, the objective is that the video, audio, and service multiplex/transport subsystems be useful in other applications. Further general information about the Digital Television Standard is presented in the following publication: Advanced Television Systems Committee, Standard A/54: Guide to the Use of the ATSC Digital Television Standard, Oct. 4, 1995.

One component of the digital ATV is known as "RF/Transmission," which refers to channel coding and modulation. The channel coder takes the data bit stream and adds additional information that can be used by the receiver to reconstruct the data from the received signal, which, due to transmission impairments, may not accurately represent the transmitted signal. The modulation (or physical layer) uses the digital data stream information to modulate the transmitted signal. One mode of the modulation subsystem is the terrestrial broadcast mode, also known as "8 VSB," which uses vestigial sideband modulation with 8 discrete amplitude levels.

As more fully described in the above-referenced Standard A/54, the VSB signal contains features, which allow design of receivers that perform the functions of acquiring and locking to the transmitted signal. The equalization of the signal for channel frequency response and echoes uses a training signal, and is facilitated by the inclusion of specific features in the Data Field Sync. Utilization of these features is made more reliable by the provision of means to first acquire and synchronize to the VSB signal, particularly by the Segment Sync. The Data Field Sync then can be used both to identify itself and to further perform equalization of linear transmission distortions. The VSB signal may also be equalized by databased or blind equalization methods, which do not use the Data Field Sync. Blind equalization methods are more fully described in the above-referenced Standard A/54.

A standard VSB receiver is shown in FIG. 1, and includes a tuner 1, an IF filter and synchronous detector 3, synchronization and timing circuits 5, an NTSC rejection filter 7, an equalizer 9 for equalization of the signal for channel frequency response and echoes, a phase tracker 11, a trellis decoder 13, a data de-interleaver 15, a Reed-Solomon decoder 17, and a data de-ramdomizer 19. Standard VSB receivers also are available from various manufacturers, including the IEEE 1394/Device Bay ATSC DTV receiver reference design available from Philips Semiconductors, Philips Electronics N.V., 811 East Arques Avenue, Sunnyvale, Calif., 94088-3409 (incorporates a Philips type TDA8960 demodulator/decoder single chip component).

Despite significant advancements in today's digital telecommunications, echo interference remains one of the most damaging distortions within the communication links. Strong echo interference can collapse digital communication links altogether. The collapse of the digital communication link is due to an intermediate distortion scenario called inter-symbol interference ("ISI"), which results from the interactions between the echo conditions and the transmitted data itself.

Various proposals and methods are know or are in practice today to reduce the impact of echo interference which use equalizers whose weights are primarily from adaptation and mainly based on statistical data information obtained from the multipath or dispersive communication channels. Some of these proposals and methods are described in the following article: David Koo, "Ghost Cancellation with ITU System-C standard Ghost Cancellation Reference Signal," Journal of the Society of Motion Picture and Television Engineers, June 1995, PP. 370–376. Nonetheless, the current ATSC 8 VSB digital ATV system remains heavily susceptible to echo interference, even though it is not noise limited. It is therefore desirable to improve the performance of the ATSC 8 VSB digital ATV system as well as other similar digital communications systems in the presence of echoes while maintaining their advantage in a white noise environment.

BRIEF SUMMARY OF THE INVENTION

One embodiment of the invention is an equalizer comprising an extraction circuit for extracting a copy of an echo cancellation reference signal from a digital data stream transmitted over a transmission path; a microprocessor coupled to the extraction circuit for calculating filter coefficients from the extracted copy of the echo cancellation reference signal; and a filter receiving the digital data stream at an input thereof and coupled to the microprocessor for receiving the filter coefficients and substantially canceling echo interference from the digital data stream using the filter coefficients. The echo cancellation reference signal is non-cyclic, has a substantially flat frequency response within the bandwidth of the transmission path, has a large plurality of amplitude peaks over a time interval, and has proportionally shorter tails relative to the large plurality of amplitude peaks.

Another embodiment of the invention is an apparatus for substantially eliminating echoes occurring during transmission of a digital data stream comprising a plurality of field syncs over a transmission path, a plurality of segments of symbol spaces being between successive ones of the field syncs, and a plurality of echo cancellation reference signals between the field snycs. The apparatus comprises means for receiving the digital data stream after transmission; means for extracting copies of the echo cancellation reference signals from the received digital data stream; means for calculating filter coefficients from the extracted copies of the echo cancellation reference signals; and means for substantially canceling echo interference from the received digital data stream using the filter coefficients. The echo cancellation reference signals are non-cyclic, have a substantially flat frequency response within the bandwidth of the transmission path, have a large plurality of amplitude peaks over a time interval, and have proportionally shorter tails relative to the large plurality of amplitude peaks.

A further embodiment of the invention is an apparatus for modifying an ATSC VSB data stream prior to transmission to a receiver to support an enhanced echo cancellation capability in the receiver, the ATSC VSB data stream comprising a plurality of field syncs and a plurality of segments of symbol spaces between successive ones of the field syncs, the apparatus comprising means for inserting a plurality of echo cancellation reference signals between the field snycs, the echo cancellation reference signals being of a class of signals substantially defined by $$f(t) = \frac{1}{2\pi}\int_0^\Omega [A\cos(b\omega^2) + jA\sin(b\omega^2)]e^{j\omega t}\,d\omega + \frac{1}{2\pi}\int_{-\Omega}^0 [A\cos(-b\omega^2) + jA\sin(-b\omega^2)]e^{j\omega t}\,d\omega$$

wherein A, b and $\Omega$ are real numbers.

Yet another embodiment of the invention is a method for substantially eliminating echoes occurring during transmission of a digital data stream comprising a plurality of field syncs over a transmission path, a plurality of segments of symbol spaces being between successive ones of the field syncs, and a plurality of echo cancellation reference signals between the field snycs. The method comprises receiving the digital data stream after transmission; extracting copies of the echo cancellation reference signals from the received digital data stream; calculating filter coefficients from the extracted copies of the echo cancellation reference signals; and substantially canceling echo interference from the received digital data stream using the filter coefficients. The echo cancellation reference signals are non-cyclic, have a substantially flat frequency response within the bandwidth of the transmission path, have a large plurality of amplitude peaks over a time interval, and have proportionally shorter tails relative to the large plurality of amplitude peaks.

A further embodiment of the invention is a method for modifying an ATSC VSB data stream prior to transmission to a receiver to support an enhanced echo cancellation capability in the receiver, the ATSC VSB data stream comprising a plurality of field syncs and a plurality of segments of symbol spaces between successive ones of the field syncs, the method comprising inserting a plurality of echo cancellation reference signals between the field snycs, the echo cancellation reference signals being of a class of signals substantially defined by $$f(t) = \frac{1}{2\pi}\int_0^\Omega [A\cos(b\omega^2) + jA\sin(b\omega^2)]e^{j\omega t}\,d\omega + \frac{1}{2\pi}\int_{-\Omega}^0 [A\cos(-b\omega^2) + jA\sin(-b\omega^2)]e^{j\omega t}\,d\omega$$

wherein A, b and $\Omega$ are real numbers.

DETAILED DESCRIPTION OF THE PREFERRED EMBODIMENTS

A novel echo cancellation reference ("ECR") training signal is inserted into the current ATSC 8 VSB data stream to achieve improved echo rejection while maintaining compatibility with the ATSC 8 VSB digital ATV standard. The novel ECR training signal is also suitable for other multipath or dispersive digital communication channels. A pre-equalization subsystem is included in the digital ATV system as a front end to the VSB receiver, and is trained with preferably the novel ECR training signal. One type of pre-equalization subsystem provides a fully ATSC compliant signal at its output, and therefore is particularly useful with standard VSB receivers. Another type of pre-equalization system provides a signal at its output which is ATSC compliant in some respects but which retains the ECR signal, and therefore is particularly useful for signal relays, analysis purposes, and other applications in which the residual channel information is important. The result is improved performance of the digital ATV system in the presence of echoes while maintaining its advantage in a white noise environment. The improved digital ATV system is expected to be able to cope with echoes in the range of ±80 µs and at −10 dBc.

Figure 1:
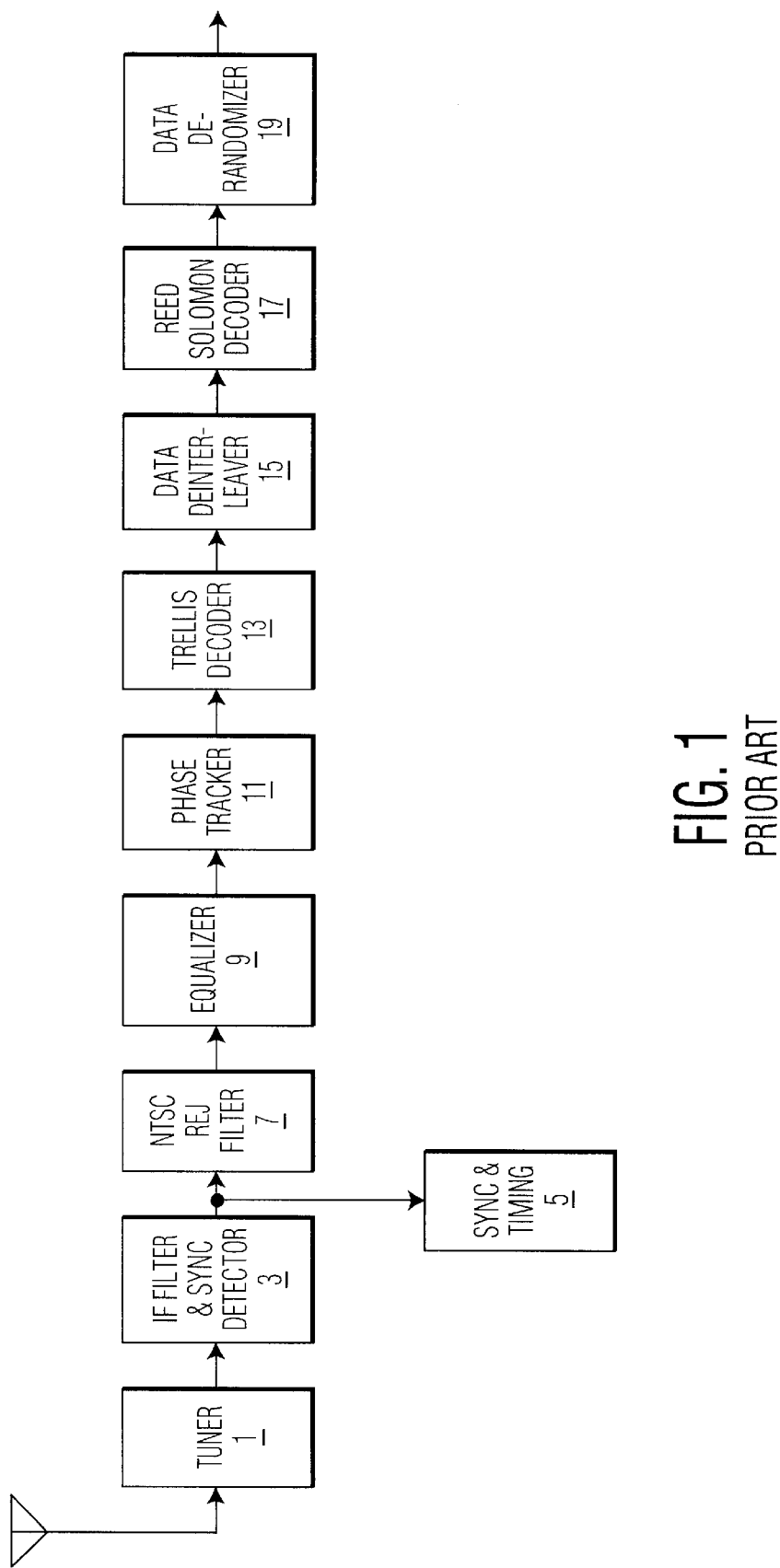
FIG. 1 is a block diagram of a conventional VSB receiver.
Figure 2:
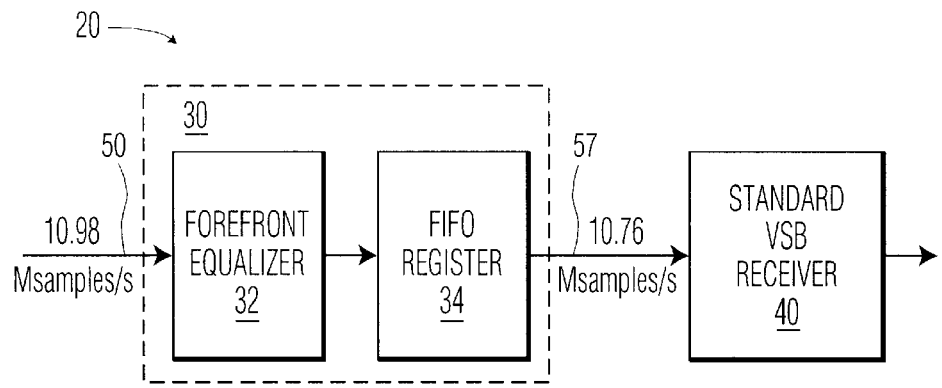
FIG. 2 is a block diagram of a digital ATV system that incorporates a pre-equalization subsystem that removes the ECR signal after equalization.

An example of a digital ATV system 20 which incorporates a pre-equalization subsystem that produces a fully ATSC compliant signal at its output is shown in FIG. 2. The improved performance of the digital ATV system 20 is achieved at the sacrifice of some increase in the transmission bit rate from 10.76 Msamples/s to 10.98 Msamples/s. The digital ATV system 20 includes a standard VSB receiver 40 such as, for example, the VSB receiver shown in FIG. 1. In addition, a pre-equalization subsystem 30 that a forefront equalizer 32 is placed in front of the VSB receiver 40. The ATSC data stream containing a suitable ECR signal is input to the forefront equalizer 32 instead of the VSB receiver 40. The forefront equalizer 32 preferably has a relatively large time span to completely cover the full echo range. Various adaptation/initialization schemes are useful for training the equalizer 32, including, for example, such well-known schemes as correlation and precision channel model estimation.

The forefront equalizer 32 preferably is trained on the novel ECR signal so that the output of the forefront equalizer 32 is a near clean signal from which the echo is substantially removed. The added ECR signal is stripped out of the data stream in a temporary memory following the forefront equalizer 32 using well-known techniques so that the resulting signal becomes an ATSC compliant signal. FIG. 2 shows a FIFO register 34 for this purpose, although many other types of memory are suitable. This resulting signal is supplied at the output of the FIFO register 34 and is passed to the standard VSB receiver 40. It will be appreciated that the forefront equalizer 32 and the FIFO register 34 may be implemented in discrete integrated circuit chips or as an integrated solution in a single chip.

Figure 3:
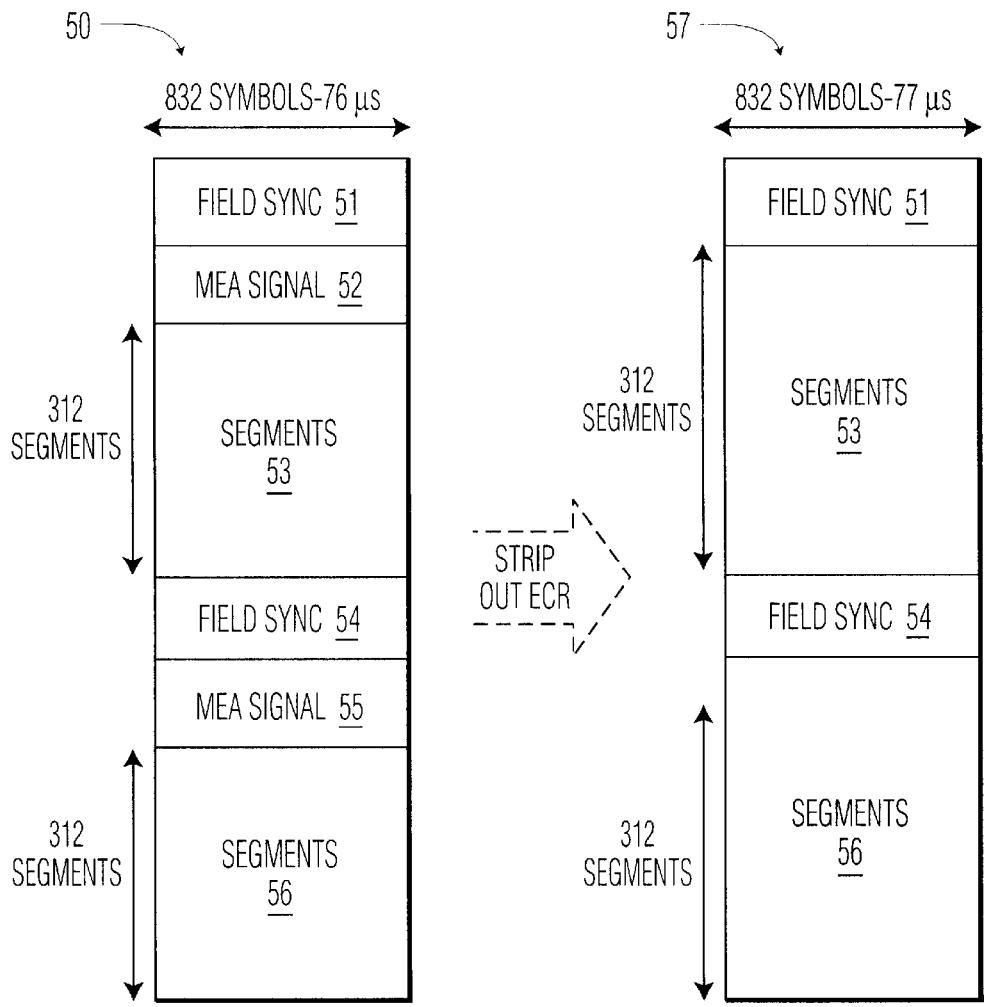
FIG. 3 is a schematic diagram of an ATSC data stream for the digital ATV system of FIG. 2 which contains an echo cancellation reference signal at various locations.

The modification to the ATSC data stream for the digital ATV system 20 is shown in the data stream 50 of FIG. 3. In the very same base-band data symbol stream of the current ATSC 8 VSB standard, a combination of periods of blank symbol spaces and the novel ECR signal is inserted between the field syncs, e.g. field syncs 51 and 54. The combination of the periods of blank symbol spaces and the ECR signal is for convenience referred to as a Macro ECR Assembly ("MEA"). Blank symbol spaces are used in the MEA to prevent contamination of the ECR due to post and pre echoes. In the representation of an ATSC data stream shown in FIG. 3, the MEA signals, e.g. MEA signals 52 and 55, illustratively are inserted into locations immediately after the field syncs. Different locations should be attempted in practice, since particular locations may provide benefits under certain conditions, especially in the case of higher temporal rate coverage for dealing with faster dynamically changing echoes. Advantageously, the insertion of the MEA signals in the current ATSC VSB data stream does not reduce the 312 segments available between the field syncs.

The ECR within the MEA preferably is a high performance echo cancellation reference signal that is a mathematically formulated high energy and high performance signal with a white spectrum. The ECR also should be specifically tailored for the anticipated digital data transmission conditions, and to receive the minimum of unwanted interference in the channel characterization process in comparison to the known signals which are applied as echo reduction references today. Examples of known signals which are applied as echo reduction references today, include pseudo-random sequences, Turner sequences, and windowed sin(x)/(x). Examples of unwanted interference includes contamination and correlations from noises (not restricted to Additive White Gaussian Noise ("AWGN") only), self echo-induced data symbols, co-channel interference and their beating products, adjacent channel signals and their beating products, and self in-channel intermodulation products. Generally speaking, a proper MEA arrangement for the whole system is to support, enhance and guarantee the required performance of the ECR mentioned above.

The MEA overhead is estimated to be at about 2% of the whole system's resources. This estimated MEA overhead is expected to be adequate for the range of echo delays and their temporal behavior in today's terrestrial data communication and broadcasting conditions based on currently available echo field testing statistics, such as those available from the echo testing reports of the National Association of Broadcasters. The estimated MEA overhead is subject to change as new echo field testing results are available.

The echo cancellation/reduction range is estimated to be about from −80 µs to +82 µs, which is based on the currently available echo field testing statistics. These echo field testing statistics show that it is quite easy to find relatively long echoes in our cities, such as +51 µs to +53 µs echoes with about 30% in voltage strength in the city of Sydney, Australia; and +61 µs to +62 µs echoes also with 30% voltage strength in the city of New York City, USA. Therefore, echoes of +70 µs to +80 µs with large amplitudes are expected to be present in New York City, and similar results are expected to be found in other cities as well. It is also believed that if long lagging echoes, such as +60 µs to +80 µs, exist with large amplitudes, leading echoes with the same time span may well be occurring because receiver antennas are not very carefully positioned by the average consumer. This means that leading echoes from −61 µs to even longer leading position in time may very likely exist in large cities.

Based on the above mentioned tests and analysis, a good terrestrial digital communication/broadcast standard and its hardware receiver system should be able to reject the echoes from leading −80 µs to lagging +80 µs, and even a little longer in order to offer an "all location" reliable receptions in bad echo environments and conditions. The digital ATV system 20 system of FIG. 2 is expected to achieve echo rejection within the range of −80 µs to +82 µs with large amplitudes, with the MEA overhead being limited to about 2% of the whole system symbol stream of the current ATSC standard. Advantageously, the current ATSC standard is not changed with respect to its original payload data rate or and current data arrangements. This will maintain decoding chip compatibility, and will lead to a relatively quicker hardware realization and a relatively simpler and quicker system testing by avoiding any need to retest the performance of the new arrangements of all the symbols, bits, interleavings, error correction codes, pay loads, and so forth.

To realize the digital ATV system 20 of FIG. 2 without changing data payload and any other bit configurations, a feasible transmission solution is to shorten the symbol time duration by about 2%. As shown in FIG. 3, the 832 symbols in each segment of the data stream 50 are shorten to about 76 µs. As a result, the base-band bandwidth is increased by about 2% correspondingly, from the original bandwidth of 5.38 MHz to a modified bandwidth of 5.49 MHz. However, the bandwidth increase in this scheme is so small that this new bandwidth is supported by all of the RF, IF, base-band and SAW filters of the current receiver front-ends. For example, the new bandwidth is supported by the tuner 1, the IF filter and synchronous detector 3, and the NTSC rejection filter 7 of the conventional VSB receiver of FIG. 1. If desired, the parameters for the original Square-Root Raised Cosine (SQRC) Filter standard (with 11.5% roll-off) could be changed by a very small amount. As long as the SQRC remains mathematically the characteristics of an SQRC, the data recovery performance will not change.

The MEA signals 52 and 55 are removed from the substantially echo free data stream at the output of the forefront equalizer 32 by the FIFO 34 before the data stream is supplied to the VSB receiver 40. This is shown in FIG. 3 wherein a substantially echo free ATSC compliant data stream 57 retains the field syncs 51 and 54 as well as the 312 segments in the areas 53 and 56, but does not contain the MEA signals 52 and 55. After re-clocking to restore the 832 symbols in each segment to 77 $\mu$, a substantially echo free ATSC data stream 57 which does not have any ECRs or MEAs and fully conforms to the current ATSC 8 VSB standard is available at the output of the pre-equalization subsystem 30, and is suitable for decoding by currently existing ATSC 8 VSB chips and systems.

With an MEA overhead of about 2%, the ECR insertion rate is at 41 ECRs per second, which is coherent with the Field Sync (FS) of the current ATSC 8 VSB standard. Based on this ECR insertion rate, Nyquist sampling theory says the rate of possible fastest dynamic echoes that can be cancelled or rejected is at about 20 Hz. This 20 Hz dynamic echo rejection rate is expected to cover many, and likely most, of the reception conditions due to the dynamic echo pattern change. However, when, with statistical facts, a higher dynamic echo rejection rate is definitely needed, a double rated ECR and MEA may be inserted. Illustratively, two MEA signals (not shown) may be inserted about 156 segments away from one another and between two field syncs. This brings the fast dynamic echo rejection rate up to 41 Hz, albeit at the penalty of raising the MEA overhead to about 4%. While this result is gradually becoming contrary to one of the major advantages of using the current ATSC 8 VSB system, namely the high data payload with very small overhead (high efficiency) in comparison with many other systems, fast dynamic echo rejection is nonetheless available if required.

A significant advantage of the digital ATV system that incorporates a pre-equalization subsystem is the subsystem's compatibility with existing systems and chips. In other words, many current existing ATSC 8 VSB systems from many manufacturers can be reused. One possible implementation for supporting chip reuse is that the pre-equalization subsystem 30 (FIG. 2) can be designed as an independent and self-contained chip or module for being placed directly in front of many current receiver chips. This is possible because the forefront equalizer 32 is estimated to remove better than 95%—perhaps as much as 98% or more—of the echoes within the incoming data streams, assuming it is under normal to heavy echoing reception conditions with reasonable incoming SNR around 27 to 28 dB. After the echo removal process, the ATSC data stream becomes sufficiently echo free and easy for processing and decoding.

Figure 4:
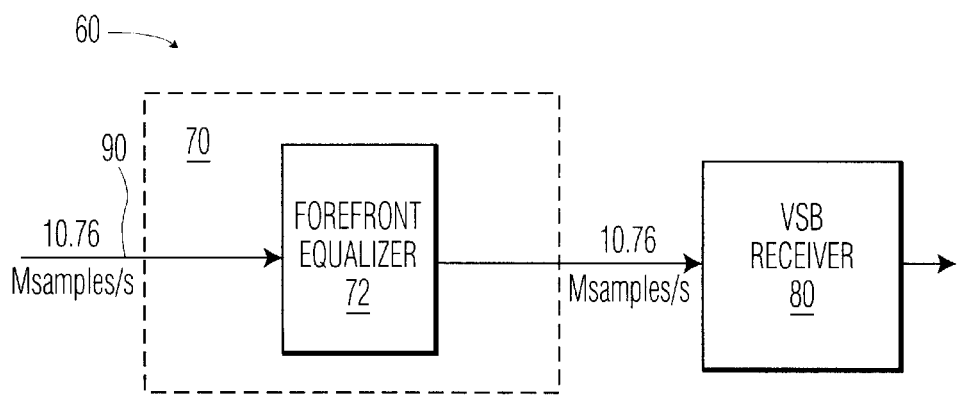
FIG. 4 is a block diagram of a digital ATV system that incorporates a pre-equalization subsystem that does not remove the ECR signal after equalization.

An example of a digital ATV system 60 that incorporates a type of pre-equalization subsystem that does not remove the ECRs and MEAs is shown in FIG. 4. The improved performance of the digital ATV system 60 is achieved at the expense of a slight decrease in data payload. The digital ATV system 60 includes a modified VSB receiver 80. A pre-equalization subsystem 70 having a forefront equalizer 72 is placed in front of the VSB receiver 80. The ATSC data stream is input to the forefront equalizer 72 instead of the VSB receiver 80. The forefront equalizer 72 is generally similar to the forefront equalizer 32 (FIG. 2) and is trained in generally the same way on preferably the novel type of ECR signal so that the output of the forefront equalizer 72 is a near clean signal from which the echo is substantially removed. It will be appreciated that the forefront equalizer 72 may be implemented in discrete integrated circuit chips or as an integrated solution in a single chip.

Unlike the pre-equalization subsystem 30 shown in FIG. 2, the pre-equalization subsystem 70 of FIG. 4 does not include a FIFO register. The whole stream of signal and data is processed without removal of the ECRs and MEAs from the data stream so that the data may be directly decoded. This is possible because in some applications, the residual channel information is still carried by the inserted ECR and it is very useful information for signal relays, analysis purposes, and so forth.

Figure 5:
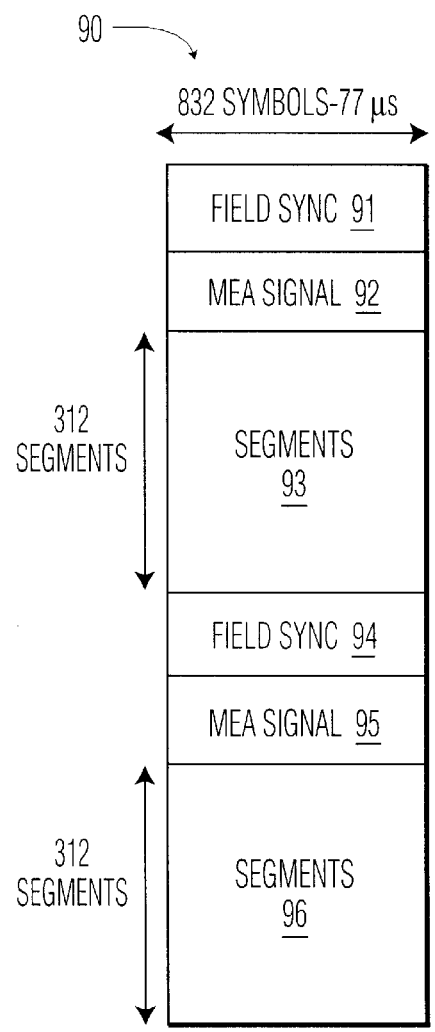
FIG. 5 is a schematic diagram of an ATSC data stream for the digital ATV system of FIG. 4 which contains an echo cancellation reference signal at various locations.

The modification to the ATSC data stream for the digital ATV system 60 is shown in the data stream 90 of FIG. 5. A combination of periods of blank symbol spaces and the novel ECR signal—the MEA—is inserted into certain locations of the data symbol stream, as is so for the data stream 50 shown in FIG. 3. However, the MEA signals are inserted into locations within each of the 312 segment areas. For example, FIG. 5 shows two 312 segment areas 93 and 96 which contain respective MEA signals 92 and 95 in positions just after the respective field syncs 91 and 94.

The MEA overhead is estimated to be at about 2% of the whole system's resources, as is so for the data stream 50 shown in FIG. 3. The echo cancellation/reduction range is estimated to be at least from −80 $\mu$s to +82 $\mu$s, as is so for the digital ATV system 20 shown in FIG. 2. However, unlike the modification to the ATSC data stream 50 shown in FIG. 3, the modification to the ATSC data stream shown in FIG. 5 does not involve changing any of the current data framing structures in the ATSC data stream. In particular, the symbol duration is unchanged. This means the whole bandwidth of the data signal is maintained, albeit at the expense of a 2% reduction in the data payload. Instead of the original 19.28 Mbit/s of the current ATSC 8 VSB standard, the data payload is reduced to 18.90 Mbit/s. It is believed that this slightly lower data payload can easily be absorbed by suitable program management. Advantageously, the transmission bandwidth and all of the filters in the VSB receiver 70, from the RF and IF filters to the base-band filters, are absolutely not affected, and there is no reason for the VSB receiver to have any parasitic problems or even be modified slightly for the system's bandwidth arrangement.

However, the VSB receiver 70 does contain some basic modifications relative to the standard VSB receiver as follows. First, the VSB receiver 70 is capable of identifying and skipping the MEA signals in the data stream 90. Second, the VSB receiver is capable of handling any break up in the convolution codes so that the twelve sequential switching sites operate properly. Third, the VSB receiver 70 is capable of picking up data in the data stream and linking it to previous states. Due to the substitution of the MEA signals for data, certain picture data is likely to be missing so that the data and possibly the convolutional codes become discontinuous. Both the transmitter and receiver should make the convolutional codes continuous from previous data streams to new data streams. Fourth, the VSB receiver 70 has a modified data interleaver that is able to maintain order when convolutional codes are discontinuous.

With an MEA overhead of about 2%, the ECR insertion rate is at 41 ECRs per second, as is so for the data stream 50 shown in FIG. 3. When, with statistical facts, a higher dynamic echo rejection rate is definitely needed, a double rated ECR and MEA may be inserted, as is so for the data stream 50 shown in FIG. 3.

Figure 6:
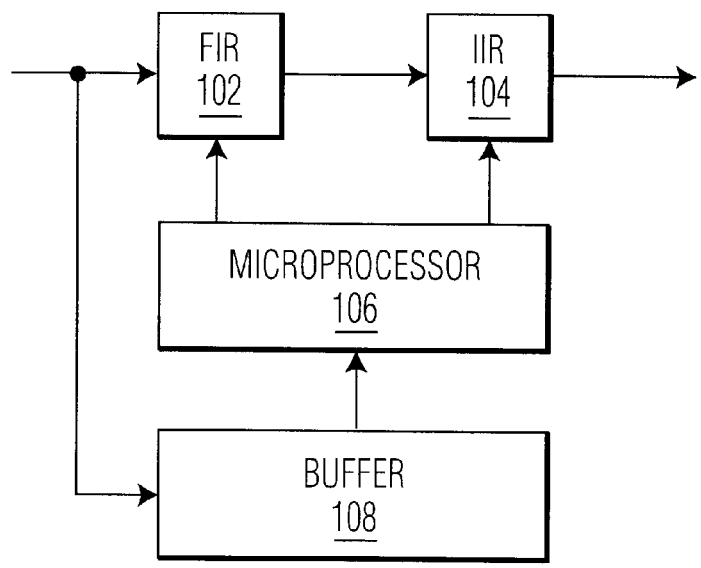
FIG. 6 is a block diagram of an equalizer suitable for the digital ATV systems of FIGS. 2 and 4.

The forefront equalizers 32 and 72 are of any suitable design, with various suitable designs being well known in the art. An example of an equalizer 100 suitable for use as the forefront equalizers 32 and 72 is shown in FIG. 6. A received digital ATSC data stream containing the MEA signals is supplied to a FIR filter 102 and to an IIR filter 104. The ECR signals in the MEA signals from the received digital ATSC data stream are placed into a buffer 108 and supplied to a microprocessor or other suitable logic 106. The microprocessor 106, which includes a memory (not shown) which contains a suitable version of the ECR as transmitted, compares the contents of the buffer 108 to the stored version of the ECR as transmitted, models the impulse response of the channel, and computes a sequence of coefficients for the filters 102 and 104 which implement the inverse channel characteristics. These filter coefficients are furnished to the filters 102 and 104 to suppress such echoes as are present, resulting in an ATSC data stream at the output of the filter 104 wherein the echo components are substantially reduced.

A suitable class of ECR signals for fulfilling the task of probing the multipath or dispersive digital communication channel is defined by the following equation:

$$f(t) = \frac{1}{2\pi}\int_0^{\Omega}[A\cos(b\omega^2) + jA\sin(b\omega^2)]e^{j\omega t}\,d\omega + \frac{1}{2\pi}\int_{-\Omega}^0 [A\cos(-b\omega^2) + jA\sin(-b\omega^2)]e^{j\omega t}\,d\omega \quad (1)$$

where, the A, b and $\Omega$ are all parameters which are altered or adjusted in order to modify or to change the characteristics of the signal within their entire functional family. For digital communications, the $\Omega$ parameter is determined to be equal to the Nyquist frequency of the sampling rate if this functional waveform is discretely sampled when the function is to be used as an echo cancellation reference signal for digital communication. The parameters A and b are chosen to establish a signal that has high energy and is compact in time. An illustrative set of values for the parameters of Equation (1) are as follows: A=0.707×8.6×10$^{-6}$ volts; b=0.9×10$^{-12}$ sec$^2$/radian; and $\Omega$=5.38×2$\pi$×10$^6$ radian/sec.

Generally, the ECR signals in this class of signals have the following characteristics: (1) a high signal energy level; (2) an absolutely white spectrum; (3) a non-cyclic characteristic; (4) a shortest time duration at a given amplitude and a given required signal energy level; (5) a time domain signal fetching length longer than the signal itself that does not affect its spectrum whiteness property; (6) an auto-correlation function that is a single $\delta$ function, especially for echo rejection in digital communications; (7) a continuous group delay function within the band of interest; and (8) based on characteristics "2" and "6" the function should be and must be a real function. The signal defined in Equation (1) satisfies all the specified characteristics "1" through "8".

Figure 7:
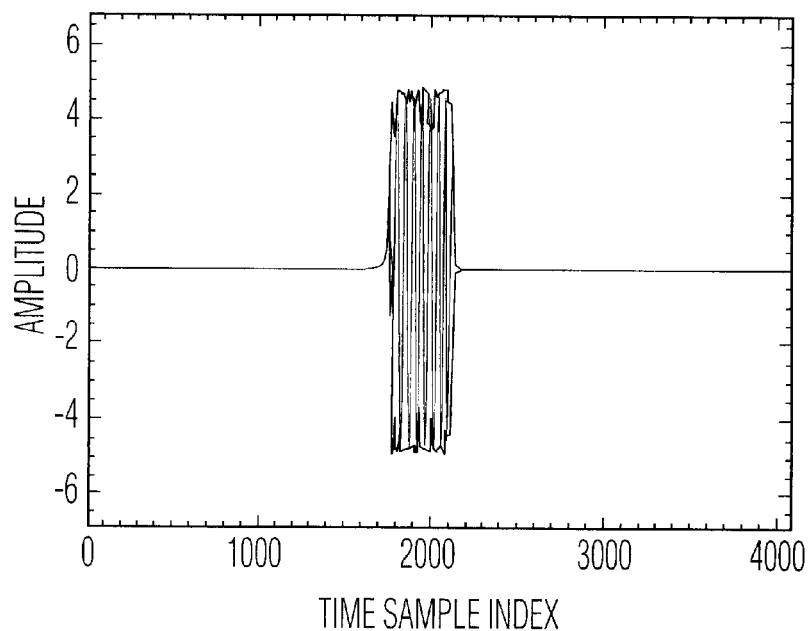
FIG. 7 is an illustrative waveform of the signal function of time from a class of echo cancellation reference signals suitable for the ATSC data streams of FIGS. 3 and 5.

An illustrative waveform of this signal function of time is shown in FIG. 7. The characteristics of this class of signal as a function of time are non-cyclical, generally flat response, and a longer signal with many more peaks than prior signals and proportionally shorter tails.

Figure 8:
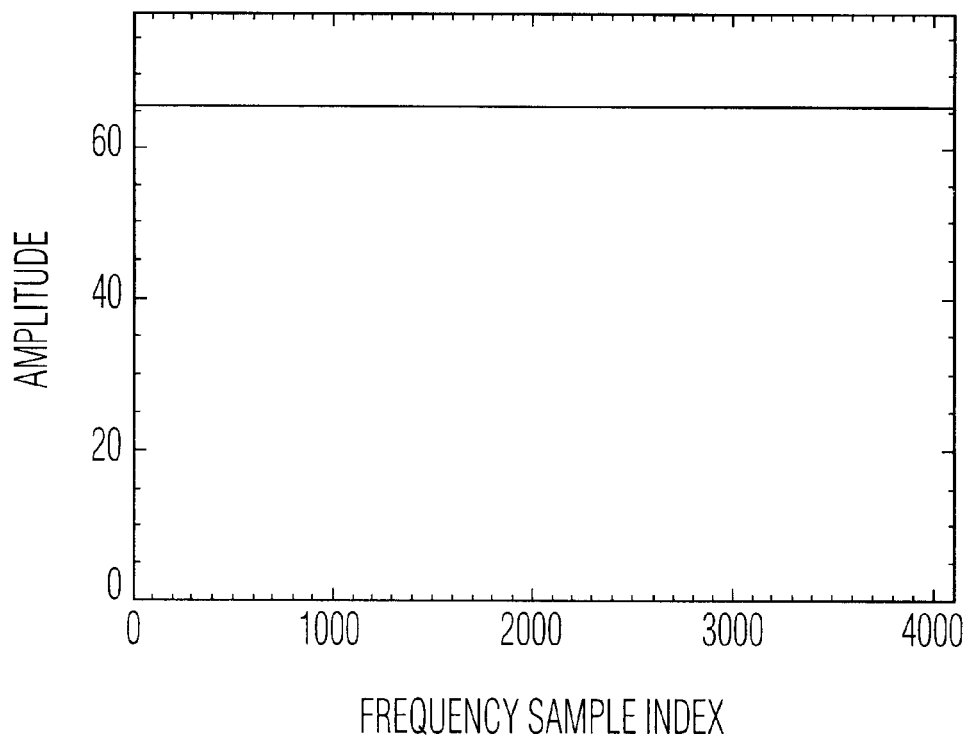
FIG. 8 is an illustrative waveform of a flat spectrum plot from a class of echo cancellation reference signals suitable for the ATSC data streams of FIGS. 3 and 5.

FIG. 8 shows a flat spectrum plot of the signal defined by Equation (1), which directly and indirectly implies the above mentioned characteristic 1, 2, 3 and 5.

The scope of my invention is set forth in the following claims. The description of the various embodiments set forth herein is illustrative of my invention and is not intended to limit the scope thereof. Variations and modifications of the embodiments disclosed herein will become apparent to those of ordinary skill in the art upon reading this document, and alternatives to and equivalents of the various elements of the embodiments will be known to those of ordinary skill in the art. These and other variations and modifications of the embodiments disclosed herein may be made without departing from the scope and spirit of the invention as set forth in the following claims.

What is claimed is:

1. An equalizer comprising an extraction circuit adapted for receiving a digital data stream input and extracting an added echo cancellation reference signal from the digital data stream transmitted over a transmission path so that said digital data stream has the echo cancellation reference signal substantially removed therefrom;

a microprocessor coupled to the extraction circuit for calculating filter coefficients from the extracted echo cancellation reference signal; and a filter receiving the digital data stream at an input thereof and coupled to the microprocessor for receiving the filter coefficients and substantially canceling echo interference from the digital data stream using the filter coefficients;

wherein the echo cancellation reference signal is non-cyclic, has a substantially flat frequency response within the bandwidth of the transmission path, has a large plurality of amplitude peaks over a time interval, and has proportionally shorter tails relative to the large plurality of amplitude peaks;

wherein the echo cancellation reference signal is of a class of signals substantially defined by:

$$f(t) = \frac{1}{2\pi}\int_0^{\Omega}[A\cos(b\omega^2) + jA\sin(b\omega^2)]e^{j\omega t}\,d\omega + \frac{1}{2\pi}\int_{-\Omega}^0 [A\cos(-b\omega^2) + jA\sin(-b\omega^2)]e^{j\omega t}\,d\omega$$

A, b and $\Omega$ being real numbers.

2. An equalizer comprising:

an extraction circuit for extracting a copy of an echo cancellation reference signal from a digital data stream transmitted over a transmission path;

a microprocessor coupled to the extraction circuit for calculating filter coefficients from the extracted copy of the echo cancellation reference signal; and a filter receiving the digital data stream at an input thereof and coupled to the microprocessor for receiving the filter coefficients and substantially canceling echo interference from the digital data stream using the filter coefficients;

wherein the echo cancellation reference signal is non-cyclic, has a substantially flat frequency response within the bandwidth of the transmission path, has a large plurality of amplitude peaks over a time interval, and has proportionally shorter tails relative to the large plurality of amplitude peaks, wherein the echo cancellation reference signal is of a class of signals substantially defined by:

$$f(t) = \frac{1}{2\pi} \int_0^\Omega [A\cos(b\omega^2) + jA\sin(b\omega^2)]e^{j\omega t} d\omega +$$
$$\frac{1}{2\pi} \int_{-\Omega}^0 [A\cos(-b\omega^2) + jA\sin(-b\omega^2)]e^{j\omega t} d\omega$$

A, b and $\Omega$ being real numbers, wherein A=0.707×8.6× $10^{-6}$ volts; b=0.9×$10^{-12}$ sec$^2$/radian; and $\Omega$=5.38×2π× $10^6$ radian/sec.

3. An equalizer for substantially eliminating echoes occurring during transmission of a digital data stream comprising a plurality of field syncs over a transmission path, a plurality of segments of symbol spaces being between successive ones of the field syncs, and a plurality of echo cancellation reference signals added between the field syncs, comprising:

means for receiving the digital data stream after transmission;

means for extracting copies of the echo cancellation reference signals from the received digital data stream;

means for calculating filter coefficients from the extracted copies of the echo cancellation reference signals; and means for substantially canceling echo interference from the received digital data stream using the filter coefficients;

wherein the echo cancellation reference signals are non-cyclic, have a substantially flat frequency response within the bandwidth of the transmission path, have a large plurality of amplitude peaks over a time interval, and have proportionally shorter tails relative to the large plurality of amplitude peaks, and includes residual channel information;

wherein the echo cancellation reference signals are of a class of signals substantially defined by:

$$f(t) = \frac{1}{2\pi} \int_0^\Omega [A\cos(b\omega^2) + jA\sin(b\omega^2)]e^{j\omega t} d\omega +$$
$$\frac{1}{2\pi} \int_{-\Omega}^0 [A\cos(-b\omega^2) + jA\sin(-b\omega^2)]e^{j\omega t} d\omega$$

A, b and $\Omega$ being real numbers.

4. An apparatus for substantially eliminating echoes occurring during transmission of a digital data stream comprising a plurality of field syncs over a transmission path, a plurality of segments of symbol spaces being between successive ones of the field syncs, and a plurality of echo cancellation reference signals between the field syncs, comprising:

means for receiving the digital data stream after transmission;

means for extracting copies of the echo cancellation reference signals from the received digital data stream;

means for calculating filter coefficients from the extracted copies of the echo cancellation reference signals; and means for substantially canceling echo interference from the received digital data stream using the filter coefficients;

wherein the echo cancellation reference signals are non-cyclic, have a substantially flat frequency response within the bandwidth of the transmission path, have a large plurality of amplitude peaks over a time interval, and have proportionally shorter tails relative to the large plurality of amplitude peaks, wherein the echo cancellation reference signals are of a class of signals substantially defined by:

$$f(t) = \frac{1}{2\pi} \int_0^\Omega [A\cos(b\omega^2) + jA\sin(b\omega^2)]e^{j\omega t} d\omega +$$
$$\frac{1}{2\pi} \int_{-\Omega}^0 [A\cos(-b\omega^2) + jA\sin(-b\omega^2)]e^{j\omega t} d\omega$$

A, b and $\Omega$ being real numbers, wherein A=0.707×8.6×$10^{-6}$ volts; b=0.9×$10^{-12}$ sec$^2$/radian; and $\Omega$=5.38×2π×$10^6$ radian/sec.

5. The equalizer as in claim 3, wherein the extracting means comprises means for extracting a copy of only one echo cancellation reference signal from between successive ones of the field syncs.

6. The equalizer as in claim 3, wherein the extracting means comprises means for extracting a copy of a plurality of echo cancellation reference signals from between successive ones of the field syncs.

7. An apparatus for modifying an ATSC VSB data stream prior to transmission to a receiver to support an enhanced echo cancellation capability in the receiver, the ATSC VSB data stream comprising a plurality of field syncs and a plurality of segments of symbol spaces between successive ones of the field syncs, the apparatus comprising means for inserting a plurality of echo cancellation reference signals between the field syncs, the echo cancellation reference signals being of a class of signals substantially defined by:

$$f(t) = \frac{1}{2\pi} \int_0^\Omega [A\cos(b\omega^2) + jA\sin(b\omega^2)]e^{j\omega t} d\omega +$$
$$\frac{1}{2\pi} \int_{-\Omega}^0 [A\cos(-b\omega^2) + jA\sin(-b\omega^2)]e^{j\omega t} d\omega$$

wherein A, b and $\Omega$ are real numbers.

8. The apparatus as in claim 7, wherein A=0.707×8.6× $10^{-6}$ volts; b=0.9×$10^{-12}$ sect$^2$/radian; and $\Omega$=5.38×2π×$10^6$ radian/sec.

9. A method for substantially eliminating echoes occurring during transmission of a digital data stream before providing said digital data stream to a vestigial side band (VSB) receiver, said digital data stream comprising a plurality of field syncs over a transmission path, a plurality of segments of symbol spaces being between successive ones of the field syncs, and a plurality of echo cancellation reference signals between the field syncs, comprising:

receiving the digital data stream after transmission;

extracting copies of the echo cancellation reference signals from the received digital data stream;

calculating filter coefficients from the extracted copies of the echo cancellation reference signals; and substantially canceling echo interference from the received digital data stream using the filter coefficients;

wherein the echo cancellation reference signals are non-cyclic, have a substantially flat frequency response within the bandwidth of the transmission path, have a large plurality of amplitude peaks over a time interval, and have proportionally shorter tails relative to the large plurality of amplitude peaks;

wherein the echo cancellation reference signals are of a class of signals substantially defined by:

$$f(t) = \frac{1}{2\pi} \int_0^\Omega [A\cos(b\omega^2) + jA\sin(b\omega^2)]e^{j\omega t}\,d\omega +$$
$$\frac{1}{2\pi} \int_{-\Omega}^0 [A\cos(-b\omega^2) + jA\sin(-b\omega^2)]e^{j\omega t}\,d\omega$$

A, b and $\Omega$ being real numbers.

10. The method as in claim 9, wherein the extracting step comprises extracting only one echo cancellation reference signal from between successive ones of the field syncs.

11. The method as in claim 9, wherein the extracting step comprises extracting a plurality of echo cancellation reference signals from between successive ones of the field syncs.

12. A method for substantially eliminating echoes occurring during transmission of a digital data stream comprising a plurality of field syncs over a transmission path, a plurality of segments of symbol spaces being between successive ones of the field syncs, and a plurality of echo cancellation reference signals between the field syncs, comprising:

receiving the digital data stream after transmission;

extracting copies of the echo cancellation reference signals from the received digital data stream;

calculating filter coefficients from the extracted copies of the echo cancellation reference signals; and substantially canceling echo interference from the received digital data stream using the filter coefficients;

wherein the echo cancellation reference signals are non-cyclic, have a substantially flat frequency response within the bandwidth of the transmission path, have a large plurality of amplitude peaks over a time interval, and have proportionally shorter tails relative to the large plurality of amplitude peaks;

wherein the echo cancellation reference signals are of a class of signals substantially defined by:

$$f(t) = \frac{1}{2\pi} \int_0^\Omega [A\cos(b\omega^2) + jA\sin(b\omega^2)]e^{j\omega t}\,d\omega +$$
$$\frac{1}{2\pi} \int_{-\Omega}^0 [A\cos(-b\omega^2) + jA\sin(-b\omega^2)]e^{j\omega t}\,d\omega$$

A, b and $\Omega$ being real numbers, wherein $A=0.707 \times 8.6 \times 10^{-6}$ volts; $b=0.9 \times 10^{-12}$ sec$^2$/radian; and $\Omega = 5.38 \times 2\pi \times 10^6$ radian/sec.

13. A method for modifying an ATSC VSB data stream prior to transmission to a receiver to support an enhanced echo cancellation capability in the receiver, the ATSC VSB data stream comprising a plurality of field syncs and a plurality of segments of symbol spaces between successive ones of the field syncs, the method comprising inserting a plurality of echo cancellation reference signals between the field syncs, the echo cancellation reference signals being of a class of signals substantially defined by:

$$f(t) = \frac{1}{2\pi} \int_0^\Omega [A\cos(b\omega^2) + jA\sin(b\omega^2)]e^{j\omega t}\,d\omega +$$
$$\frac{1}{2\pi} \int_{-\Omega}^0 [A\cos(-b\omega^2) + jA\sin(-b\omega^2)]e^{j\omega t}\,d\omega$$

wherein A, b and $\Omega$ are real numbers, and wherein the inserting step comprises inserting only one echo cancellation reference signals between successive ones of the field syncs.

14. A method for modifying an ATSC VSB data stream prior to transmission to a receiver to support an enhanced echo cancellation capability in the receiver, the ATSC VSB data stream comprising a plurality of field syncs and a plurality of segments of symbol spaces between successive ones of the field syncs, the method comprising inserting a plurality of echo cancellation reference signals between the field syncs, the echo cancellation reference signals being of a class of signals substantially defined by:

$$f(t) = \frac{1}{2\pi} \int_0^\Omega [A\cos(b\omega^2) + jA\sin(b\omega^2)]e^{j\omega t}\,d\omega +$$
$$\frac{1}{2\pi} \int_{-\Omega}^0 [A\cos(-b\omega^2) + jA\sin(-b\omega^2)]e^{j\omega t}\,d\omega$$

wherein A, b and $\Omega$ are real numbers, and wherein the inserting step comprises inserting a plurality of echo cancellation reference signals between successive ones of the field syncs.

15. A method for modifying an ATSC VSB data stream prior to transmission to a receiver to support an enhanced echo cancellation capability in the receiver, the ATSC VSB data stream comprising a plurality of field syncs and a plurality of segments of symbol spaces between successive ones of the field syncs, the method comprising inserting a plurality of echo cancellation reference signals between the field eyncs, the echo cancellation reference signals being of a class of signals substantially defined by:

$$f(t) = \frac{1}{2\pi} \int_0^\Omega [A\cos(b\omega^2) + jA\sin(b\omega^2)]e^{j\omega t}\,d\omega +$$
$$\frac{1}{2\pi} \int_{-\Omega}^0 [A\cos(-b\omega^2) + jA\sin(-b\omega^2)]e^{j\omega t}\,d\omega$$

wherein A, b and $\Omega$ are real numbers, and further comprising inserting blank symbol spaces about the echo cancellation reference signals.

* * * * *